United States Patent [19]

Casper et al.

[11] Patent Number: 5,250,178
[45] Date of Patent: Oct. 5, 1993

[54] BUOYANT CEILING WIPER FOR STACKED TANK CLARIFIER

[75] Inventors: Thomas J. Casper; Peter G. Dobbeck, both of Waukesha; Franklin J. Koehler, Menomonee Falls; Susan M. Rasper, Wales; John Thomas, Brookfield, all of Wis.

[73] Assignee: Envirex Inc., Waukesha, Wis.

[21] Appl. No.: 897,279

[22] Filed: Jun. 11, 1992

[51] Int. Cl.⁵ ............................................. B07D 21/18
[52] U.S. Cl. .................................. 210/256; 210/522; 210/525; 210/526; 198/494
[58] Field of Search .................. 210/242.1, 256, 261, 210/262, 521, 522, 523, 525, 526, 527; 198/494, 496, 497; 15/246, 256.5, 256.53

[56] References Cited

U.S. PATENT DOCUMENTS

| | | | |
|---|---|---|---|
| 1,352,210 | 9/1920 | Mount | 15/246.5 |
| 1,734,967 | 11/1929 | Gavett | 210/526 |
| 2,067,277 | 1/1937 | Miick | 210/526 |
| 2,160,535 | 5/1939 | Briggs | 210/526 |
| 3,044,627 | 7/1962 | Lind | 210/525 |
| 3,677,407 | 7/1972 | McIlvaine | 210/526 |
| 4,243,527 | 1/1981 | Leonard | 210/525 |
| 4,401,048 | 8/1983 | Rogers | 114/222 |
| 4,663,042 | 5/1987 | Rasper et al. | 210/525 |
| 4,810,383 | 3/1989 | Hannum | 210/525 |
| 4,830,748 | 5/1989 | Hall | 210/525 |
| 4,841,894 | 6/1989 | Nellessen | 114/222 |
| 4,879,028 | 11/1989 | Gibson | 210/242.1 |
| 4,997,081 | 3/1991 | Sutin | 198/728 |
| 5,080,783 | 1/1992 | Brown | 210/242.3 |

FOREIGN PATENT DOCUMENTS 58-43126  9/1983  Japan .

OTHER PUBLICATIONS

Bulletin No. 315-93, Dated Oct. 1989 titled "The Proven Non-Metallic Chain For Sludge Collector Service"-Rexnord Corporation.
Bulletin No. 315-95, Dated Oct. 1989 titled "Unique Sigma Design Collector Flights Are Stronger-Last Longer"-Rexnord Corporation.
Bulletin No. 315-97, Dated Oct. 1989 titled "Rex Loop Chain For Heavy-Duty Sludge Collector Service'"-Rexnord Corporation.

*Primary Examiner*—Christopher Upton
*Attorney, Agent, or Firm*—Michael, Best & Friedrich

[57] ABSTRACT

Disclosed herein is a wastewater treatment facility including a stacked tank clarifier having a lower tank, and an upper tank above the lower tank, the upper tank having a bottom defining a ceiling of the lower tank, and the lower tank further having a floor. The wastewater treatment facility includes a mechanism for scraping the ceiling of the lower tank. The mechanism includes a driven endless chain loop in the lower tank, and a buoyant member carried by the chain loop.

20 Claims, 2 Drawing Sheets

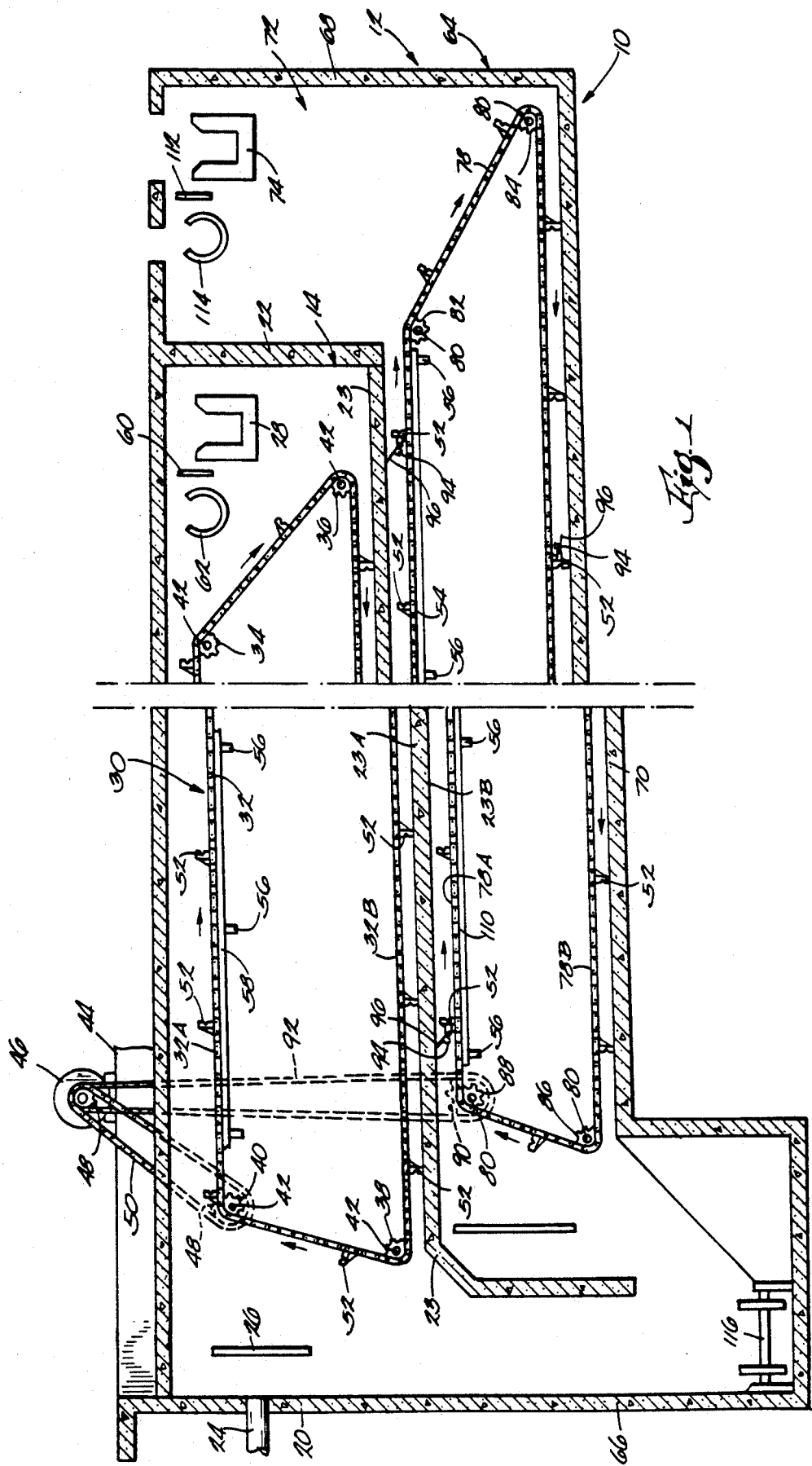

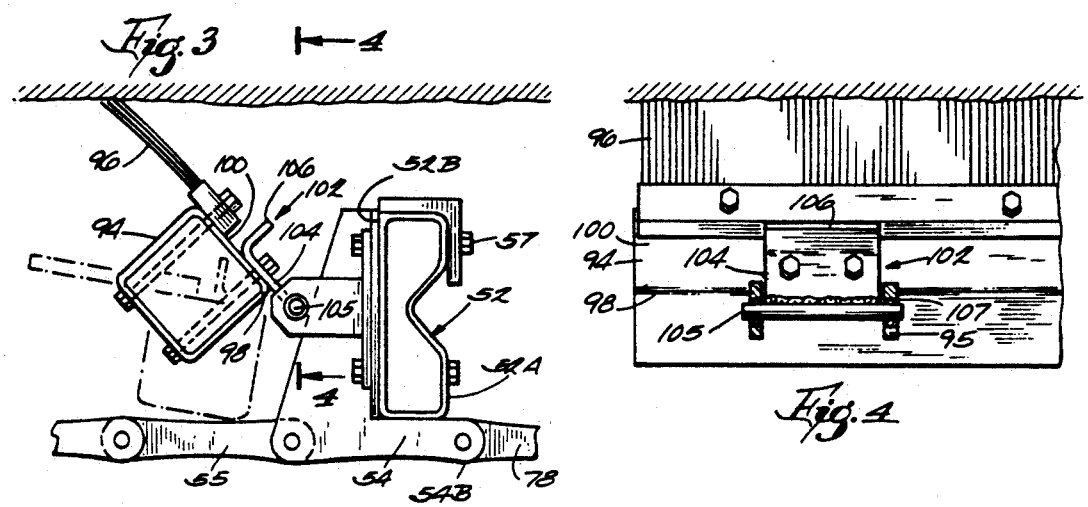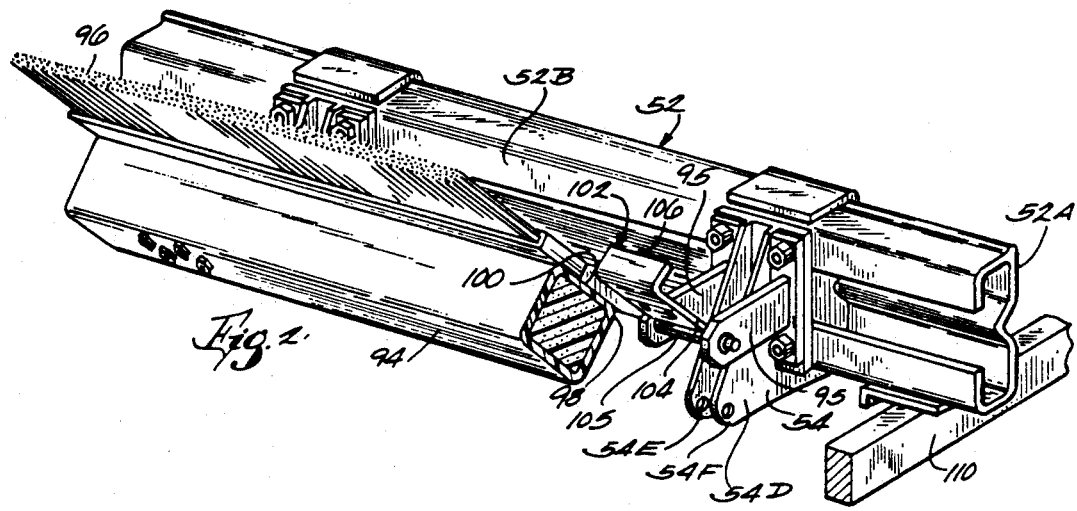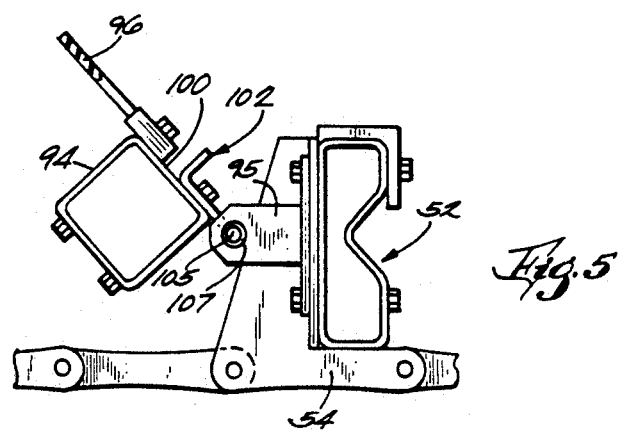

BUOYANT CEILING WIPER FOR STACKED TANK CLARIFIER

FIELD OF THE INVENTION

The present invention relates generally to sludge collector mechanisms in sedimentation tanks used in municipal and industrial waste water treatment plants to collect and convey settled sludge as well as floating waste to a point of ultimate disposal within the sedimentation tanks. More particularly, the invention relates to stacked sedimentation tank clarifiers.

BACKGROUND OF THE INVENTION

Some wastewater treatment facilities, particularly those that have limited space, employ stacked tank clarifiers instead of side by side tank clarifiers. In a stacked tank clarifier, one tank is located above a second tank in vertically stacked relation. In such stacked tank clarifiers, it is necessary to clean matter (sludge) from the ceiling of the lower tank as well as from the floor of the lower tank. This is because some matter in the lower tank floats up against the ceiling of the lower tank and remains there due to minimal waterflow in the lower tank.

A sludge collector mechanism is provided in the upper tank, and a sludge collector mechanism is also provided in the lower tank. The sludge collector mechanism in the upper tank includes transverse flights which are rigidly carried on a pair of spaced apart drive chains in a circuit along the floor of the upper tank as well as along the surface of the water in the upper tank so as to scrape the floor of the upper tank and skim the surface of the water in the upper tank.

In such prior art stacked tanks, the sludge collector mechanism in the lower tank typically includes rigid transverse flights which are carried on a pair of spaced apart drive chains in a circuit along the floor of the lower tank to scrape the floor of the lower tank, and along the ceiling of the lower tank. These flights in the lower tank do not effectively scrape the ceiling of the lower tank. The rigid flights do not effectively scrape the ceiling of the lower tank because the surface of the ceiling is not uniform and because the rigid flights become worn to conform to the lowest surfaces of the ceiling of the lower tank, and become ineffective for scraping the other surfaces of the ceiling of the lower tank. There may be as much as 1" of tolerance in the surface of the ceiling of the lower tank; i.e., the lowest surfaces of the ceiling of the lower tank may be as much as 1" lower than the uppermost surfaces of the ceiling of the lower tank.

The flights used to scrape the floor of the lower tank must be rigid because the sludge that collects at the floor of the lower tank is substantially heavier than the sludge that collects at the ceiling of the lower tank, and a rigid collector flight is required to move the sludge along the floor of the tank.

One prior art structure for scraping the ceiling of a lower tank of stacked settling tanks is disclosed in Hitachi Japanese Patent Disclosure 58-43126. The apparatus disclosed in Japanese Patent Disclosure 58-43126, includes wooden flights pivotally attached to a chain.

Other prior art apparatus for scraping the ceiling of a lower tank include flexible members rigidly attached to the rigid flights carried by the pair of drive chains. A problem with such apparatus is that the flexible members contact the walls and floor of the lower tank in addition to the ceiling of the lower tank, and tend to wear quickly. Another problem with such apparatus is that the flexible members tend to get hung up at the transitions between the walls of the tank and the floor of the tank, thereby interfering with proper movement of the chains in the lower tank, and resulting in chain and sprocket wear. Another deficiency of such apparatus is that the flexible members interfere with proper scraping of the floor of the lower tank by raising the rigid flights off of the floor. Another problem with such apparatus is that the flexible members quickly become worn to conform to the lowest surfaces of the ceiling of the lower tank, and become ineffective for scraping remaining surfaces of the ceiling of the lower tank.

SUMMARY OF THE INVENTION

The invention provides a wastewater treatment facility comprising a stacked tank clarifier including a lower tank, and an upper tank positioned above the lower tank; and a mechanism for scraping the ceiling of the lower tank, the scraping mechanism including a chain loop in the lower tank, a buoyant member pivotally attached to the chain loop, and a resilient ceiling scraping member attached to the buoyant member and pivotal with the buoyant member.

In one embodiment of the invention, the resilient scraping member is a brush or squeegee attached to the buoyant member, the brush or squeegee being biased against the ceiling of the lower tank by the buoyancy of the buoyant member.

One advantage of the apparatus embodying the invention is that the brush or squeegee does not contact the floor of the lower tank so that unnecessary wear of the scraping mechanism is avoided.

Another advantage of the apparatus embodying the invention is that the buoyancy of the buoyant member biases the brush or squeegee against the ceiling of the lower tank at substantially the same pressure when the brush or squeegee is worn as when the brush or squeegee is new.

Another advantage of the invention is that a brush or squeegee, as opposed to a wooden ceiling scraping flight, can accommodate variations in the surface of the ceiling along the width of the ceiling for any given position of chain travel. The wooden flight's ability to scrape is limited by the lowest ceiling surface along the width of the tank for each position of chain travel.

Other features and advantages of the invention will become apparent to one of ordinary skill in the art upon review of the following detailed description of the preferred embodiment of the invention, reference being made to the appended drawings.

BRIEF DESCRIPTION OF THE DRAWINGS

FIG. 1 is a longitudinal sectional view of a wastewater treatment facility embodying the invention.

FIG. 2 is a perspective view, partially in section, showing a collector flight assembly included in the facility illustrated in FIG. 1.

FIG. 3 is a side view showing the collector flight assembly of FIG. 2.

FIG. 4 is a section view taken along line 4—4 of FIG. 3.

FIG. 5 is a side view showing an alternative embodiment of the collector flight assembly of the invention.

DETAILED DESCRIPTION OF THE PREFERRED EMBODIMENT OF THE INVENTION

Shown in the various figures is a wastewater treatment facility 10. The wastewater treatment facility 10 includes a stacked tank clarifier 12 formed of reinforced concrete. The stacked tank clarifier 12 comprises an upper tank 14. The upper tank 14 has opposite side walls (not shown) an influent end wall 20, an effluent end wall 22. A width dimension is defined between the opposite side walls. The upper tank 14 further has a bottom 23 defining a floor 23A of the upper tank 14.

The wastewater treatment facility 10 includes a conduit 24 which extends through the influent end wall 20 and which delivers influent wastewater (or water that is to be treated) into the upper tank 14. The facility 10 further includes a baffle 26 that extends across the top of the upper tank 14, that extends between the side walls, and that extends downwardly in front of and somewhat below the conduit 24 to minimize the turbulence created by the influent wastewater.

The facility 10 further includes one or more box weirs 28 near the effluent end wall 22 of the upper tank 14, which weirs 28 define transverse channels for flow out of the upper tank 14.

As wastewater in the tank travels through the tank, settlable solids or sludge descends to the floor 23A, and floatable wastes or scum rises to the surface of the liquid in the upper tank 14.

The facility 10 includes a sludge collector mechanism 30 in the upper tank 14 to facilitate the removal of floating scum and settled sludge. The collector mechanism 30 includes first and second parallel spaced apart endless flexible members 32 respectively located adjacent the side walls. In the preferred embodiment, the flexible members 32 are respective chain loops. While other materials could be employed, in one embodiment the chain loops 32 are formed of polymeric material (such as molded acetal, polyester, or nylon resin) and comprise non-metallic chain links sold by Envirex Co. such as the chain links described in Rex Bulletin No. 315-93, 10/89 (incorporated herein by reference) or the chain links described in Rex Bulletin No. 315-97, 10/89 (incorporated herein by reference). The chain loops 32 each include an upper segment 32A proximate the top of the upper tank 14 and a lower segment 32B proximate the floor 23A of the upper tank 14.

The collector mechanism 30 includes pairs of opposed spaced apart bearings (not shown) rotatably attached to the side walls, and further includes transversely extending shafts 42. Each shaft 42 is supported by one of the bearing pairs for rotation therewith. The collector mechanism 30 further includes sprocket pairs 34, 36, 38, and 40, each pair being mounted on one of the shafts 42, and each sprocket of each pair being spaced apart from the other sprocket of the pair. The chains 32 are respectively trained around the sprocket pairs 34, 36, 38, and 40. The collector mechanism 30 further includes a drive sprocket 48 on the shaft 42 that supports the sprocket pair 40. The collector mechanism 30 further includes a platform 44 above the upper tank 14, a motor 46 mounted on the platform 44, and a driving chain 50 drivingly connecting the motor 46 to the drive sprocket 48.

The collector mechanism 30 further includes a plurality of transversely extending collector flights 52 secured to the chains 32 at selected sequential positions along the chains 32. Each collector flight 52 is secured to a pair of spaced apart flight attachments 54 (see FIG. 3), which flight attachments 54 are components of the chains 32, in the manner disclosed in U.S. Pat. 4,663,042 issued to Rasper et al. on May 5, 1987. In the preferred embodiment, the collector flights 52 and flight attachments 54 are substantially identical to the collector flights and flight attachments disclosed in U.S. Pat. No. 4,663,042, issued to Rasper et al. on May 5, 1987, and incorporated herein by reference.

The flight attachments 54 each include a lower link portion 54A which is constructed similarly to standard chain links 55 included in the chain 32. Each chain link 55 and each lower link portion 54A includes elongated, laterally flattened and generally parallel left and right sidearms or sidebars. In the illustrated arrangement, the sidebars of the links 55 have arcuate upper and lower edges while the sidebars of the lower link portions 54A have arcuate lower edges 54B but linear upper edges 54C.

In one embodiment of the invention, each flight attachment 54 is integrally molded.

The flight attachments 54 each include a cantilevered collector flight support portion 54D defined by a pair of parallel left and right gusset members 54E and 54F respectively contiguous with the left and right sidearms or sidebars. The collector flight support portion 54D projects upwardly from the lower link portion 54A. The collector flight support portion 54D further includes a planar plate portion 54G which, in the orientation shown in FIG. 2, extends generally vertically, and transversely, with respect to the sidebars of the lower link portion 54A, for an extent greater than the distance between the sidebars of the lower link portion 54A. The plate portion 54G is laterally centrally disposed, with respect to the left and right sidebars of the lower link portion. The plate portion 54G is attached to the gusset members 54E and 54F at forward edges of the gusset members, and the plate portion 54G extends upwardly from the lower link portion 54A in the orientation shown in FIG. 2. The plate portion 54G includes a forwardly facing planar surface for supporting a collector flight 52. The plate portion 54G is provided with a first pair of mounting holes, and a second pair of mounting holes separated from the first pair of holes by the cantilevered portion 54D. Each collector flight 52 is secured to a spaced apart pair of plate portions 54G of the parallel spaced apart chains 32 by fasteners 57 extending through the collector flight 52 and through the mounting holes in the plate portions 54G.

Each collector flight 52 has a front face 52A adapted to scrape sludge when the flight attachments 54 to which the collector flight 52 is attached define respective portions of the lower segments of the chain loops, and each collector flight 52 has a rear face 52B opposite the front face 52A.

The facility 10 preferably further includes a pair of spaced apart substantially parallel rails (not shown) which are embedded in the floor 23A of the upper tank 14, which extend longitudinally (i.e. in the direction from the influent end wall 20 to the effluent end wall 22) in the tank 14 and extend slightly above the floor 23A of the upper tank 14 to define tracks for the flights 52 as they move along the floor 23A of the upper tank 14.

The facility 10 further includes a plurality of pairs of spaced apart brackets 56, respectively secured to each side wall of the upper tank 14 below the tops of the side walls and at longitudinally spaced positions along the side walls. The facility 10 further includes a longitudinally extending rail 58 secured to the brackets 56 on each side wall of the upper tank 14 to define tracks for the flights 52 as they skim the surface of the liquid in the upper tank 14.

The facility 10 further includes a baffle 60 extending laterally across the tank 14 in a location upstream of the effluent end wall 22 and of the box weir 28, and for preventing floating waste from flowing further downstream. The facility further includes a collecting trough 62, upstream and in front of the baffle 60, for collecting floating wastes that have been skimmed from the surface of the waste water and for discharging the collected floating wastes from the stacked clarifier tank 14.

The facility 10 further includes a lower tank 64. The lower tank 64 has an influent wall 66 that is contiguous with and coplanar with the influent end wall 20 of the upper tank 14 and that extends downwardly from the influent end wall 20 of the upper tank 14, below the bottom 23 of the upper tank 14. The lower tank 64 further includes a ceiling 23B defined by the bottom 23 of the upper tank 14.

The lower tank 64 further includes an effluent end wall 68 forward of the effluent end wall 22 of the upper tank 14 (i.e., the effluent end wall 22 of the upper tank 14 is located between the influent end wall 20 and the effluent end wall 68 of the lower tank). The lower tank 64 further includes a floor 70, and sidewalls, contiguous with and coplanar with the sidewalls of the upper tank 14, and extending downwardly from the sidewalls of the upper tank 14.

The bottom 23 of the upper tank 14 does not completely separate the upper tank 14 from the lower tank 64. A space is provided in the bottom 23 of the upper tank, proximate the influent end wall 20 or 66 and for the width of the tank (between the side walls), so that there is free flow of material between the upper tank 14 and the lower tank 64 proximate the influent end wall 20 or 66. Also, the bottom 23 of the upper tank does not extend forward of the effluent end wall 22 of the upper tank 14, and the lower tank includes a space 72 above the ceiling 23B and forward of the effluent end wall 22.

The facility 10 further includes one or more box weirs 74 near the effluent end wall 68 of the lower tank 64, which weirs 74 define transverse channels for flow out of the lower tank 64.

As wastewater in the lower tank 64 travels through the lower tank 64, settlable solids or sludge descends to the floor 70, and floatable wastes or scum rises to the surface of the liquid in the lower tank 64, above the space 72.

The facility 10 includes a sludge collector mechanism 76 in the lower tank 64 to facilitate the removal of floating scum and settled sludge.

The collector mechanism 76 includes first and second parallel spaced apart endless flexible members 78 respectively located adjacent the side walls. In the preferred embodiment, the flexible members 78 are respective chain loops. While other materials could be employed, in one embodiment of the invention the chain loops 78 are formed of polymeric material and comprise non-metallic chain links sold by Envirex Co. such as the chain links described in Rex Bulletin No. 315-93, 10/89 or the chain links described in Rex Bulletin No. 315-97, 10/89. The chain loops 78 each include an upper segment 78A proximate the ceiling 23B of the lower tank 64 and a lower segment 78B proximate the floor 70 of the lower tank 64.

The collector mechanism 76 includes pairs of opposed spaced apart bearings (not shown) rotatably attached to the side walls, and further includes transversely extending shafts 80. Each shaft 80 is supported by one of the bearing pairs for rotation therewith. The collector mechanism 76 further includes sprocket pairs 82, 84, 86, and 88, each pair being mounted on one of the shafts 80, and each sprocket of each pair being spaced apart from the other sprocket of the pair. The chains 78 are respectively trained around the sprocket pairs 82, 84, 86, and 88. The collector mechanism 76 further includes a drive sprocket 90 on the shaft 80 that supports the sprocket pair 88. The collector mechanism 76 further includes a driving chain 92 drivingly connecting the motor 46 to the drive sprocket 90.

The collector mechanism 76 further includes a plurality of transversely extending collector flights 52 secured to the chains 78 at selected sequential positions along the chains 78. Each collector flight 52 is secured to a pair of spaced apart flight attachments 54 (see FIGS. 2 and 3), which flight attachments 54 are components of the chains 78. In the preferred embodiment, the collector flights 52 and flight attachments 54 in the lower tank 64 are substantially identical to the collector flights and flight attachments in the upper tank 14. The collector flights 52 in the lower tank 64 are supported such that they do not scrape the ceiling 23B of the lower tank 64.

The facility 10 further includes means for scraping the ceiling 23B of the lower tank 64. In the illustrated embodiment, the scraping means includes a laterally extending buoyant member 94 pivotally attached to selected pairs of sequential flight attachments 54 in the lower tank 64, and a laterally extending resilient scraping member 96 attached to each buoyant member 94 and movable with the buoyant member relative to the flight attachment 54. The buoyant members 94 are pivotally attached to the flight attachments 54, proximate the rearward faces 52B of the flight attachments 54.

In the illustrated embodiment, each buoyant member 94 comprises a hollow tube with a square cross section, which square has four corners and four sides. Each tube is pivotally connected to a pair of flight attachments 54 proximate a corner 98 of the tube. The scraping member 96 is attached to and extends parallel with the highest 100 of the sides of the square which extend from the corner 98, considered when the spaced apart flight attachments 54 to which the tube is attached respectively define portions of the upper segments 78A of the chain loops 78. In one embodiment of the invention, each of the sides of the square is 4" long, and each of the side of the square being ¼" thick, and the tube is formed of 226 lb. fiberglass. Each buoyant member 94 further comprises closed cell polyurethane foam of 2 lb. density filling the tube.

The facility 10 includes, in the lower tank 64, a pair of parallel, laterally flattened, elongated bracket members 95, spaced apart by the gusset members 54E and 54F, and extending rearwardly from the plate portion 54G of selected flight attachments 54, and a pair of (laterally) axially aligned bronze bushings 107 respectively pressed-in to the bracket members 95. The facility 10 further includes a pair of generally L-shaped brackets 102 each having a main planar portion 104 attached to and extending parallel with the side 100 of the tube to which the buoyant member 94 is attached. The main portion 104 has a first end from which a second planar portion 106 of the bracket 102 extends in a direction normal to the portion 104. The second portion 106 extends away from the side 10 of the tube and toward the flight attachment 54 in the orientation shown in FIG. 2. The main portion 104 further has a second end, opposite from the first end, welded to a pivot rod 105 which pivot rod 105 extends laterally between the brackets 95 and is pivotally supported in the bushings 107 in the brackets 95. The pivot rod 105 is laterally captured between the brackets 95. Alternatively, the L-shaped bracket 102 can be welded to a tube (instead of to the pivot rod 105), which tube pivots around a bolt supported by and secured to the brackets 95.

In one embodiment of the invention, the brackets 95 are integrally molded with the selected flight attachments 54. In the illustrated embodiment, a buoyant member 94, a resilient scraping member 96, and brackets 95 are provided on every fifth pair of spaced apart flight attachments 54 of the spaced apart chains 78.

The buoyancy of each buoyant member 94 biases the attached scraping member 94 against the ceiling 23B of the lower tank 64 as shown in FIG. 1. The buoyancy of each buoyant member 94 pivots the attached scraping member 94 away from the floor 70 of the lower tank 64 when the flight attachments 54, to which the buoyant member 94 is attached, respectively define portions of the lower segments 78B of the chain loops 78.

Each scraping member 94 extends generally upwardly and rearwardly from the flight attachments 54, to which the scraping member 94 is attached, toward the ceiling 23B of the lower tank 64 when those flight attachments 54 define portions of the upper segments 78A of the chain loops 78 (wherein a forward direction is defined as the direction of travel of the upper segments 78A of the chain loops 78A, and is shown by an arrow).

In the preferred embodiment of the invention, each scraping member 96 is a brush, as shown in FIGS. 2-4. In an alternative embodiment of the invention, each or some of the scraping members 96 are squeegees, as shown in FIG. 5.

The facility 10 further includes means, other than the buoyancy of the buoyant members 94, for preventing the scraping members 96 from pivoting forward of vertical when the flight attachments 54 to which the buoyant member 94 is attached define respective portions of the upper segments 78A of the chain loops 78. In the illustrated embodiment, this means comprises a surface attached to the buoyant member 94 being arranged to engage a surface on the attached flight attachment 54 or collector flight 52 when the scraping member 96 reaches or approaches a vertical orientation (when the flight attachments 54 to which the buoyant member 94 is attached define respective portions of the upper segments 78A of the chain loops 78). More particularly, this means for preventing the scraping members 96 from pivoting forward of vertical comprises the second portion 106 of each L-shaped bracket being sized to engage the plate 54G if the scraping member 96 reaches or approaches a vertical orientation (when the flight attachments 54 to which the buoyant member 94 is attached define respective portions of the upper segments 78A of the chain loops 78).

In the illustrated embodiment, the buoyant force created by the buoyant member is 2.7 pounds per lineal foot.

The facility 10 preferably further includes a pair of spaced apart substantially parallel rails (not shown) which are embedded in the floor 70 of the lower tank 64, which extend longitudinally (i.e. in the direction from the influent end wall 66 to the effluent end wall 68) in the tank 64 and extend slightly above the floor 70 of the lower tank 64 to define tracks for the flights 52 as they move along the floor 70 of the lower tank 64. The facility 10 further includes a plurality of pairs of spaced apart brackets 56, respectively secured to each side wall of the lower tank 64 below the ceiling 23B and at longitudinally spaced positions along the side walls. The facility 10 further includes longitudinally extending rails 110 secured to the brackets 56 on each side wall of the lower tank 64 to define tracks for the flights 52 as they skim the surface of the liquid in the lower tank 64.

The facility 10 further includes a baffle 112 extending laterally across the tank 64 in a location upstream of the effluent end wall 68 and of the box weir 74, and for preventing floating waste from flowing further downstream. The facility further includes a collecting trough 114, upstream and in front of the baffle 112, for collecting floating wastes that have collected at the surface of the waste water and for discharging the collected floating wastes from the stacked clarifier tank 14.

The facility 10 further includes a sludge trough 116 at the bottom of the lower tank 64 and proximate the influent end wall 66. Sludge is deposited in the sludge trough 116 as it is collected from the bottom of the upper and lower tanks by the collector flights 52. The sludge is pumped out of the clarifier tank 14 from the sludge trough 116 intermittently or continuously as required.

In view of the foregoing, a wastewater treatment facility has been provided comprising a stacked tank clarifier including a lower tank, and an upper tank positioned above the lower tank; and a mechanism for scraping the ceiling of the lower tank, the scraping mechanism including a chain loop in the lower tank, and a buoyant member pivotally attached to the chain loop. The scraping mechanism includes a brush or squeegee attached to the buoyant member, the brush or squeegee being biased against the ceiling of the lower tank by the buoyancy of the buoyant member.

An apparatus has been disclosed wherein the brush or squeegee, for scraping the ceiling of the lower tank, does not contact the floor of the lower tank. Therefore, unnecessary wear of the scraping member is avoided.

Further, an apparatus has been disclosed wherein the buoyancy of the buoyant member biases the attached brush or squeegee against the ceiling of the lower tank at substantially the same pressure when the brush or squeegee is worn as when the brush or squeegee is new.

While a preferred embodiment of the invention has been disclosed, various modifications will become apparent to one of ordinary skill in the art. Thus, the scope of the invention is to be limited only by the spirit and scope of the following claims.

I claim:

1. A wastewater treatment facility comprising:
    a stacked tank clarifier including a lower tank having a floor, and including an upper tank positioned above said lower tank said upper tank having a bottom defining a ceiling of said lower tank;
    a movable endless chain loop in said lower tank, said chain loop including an upper segment proximate the ceiling of said lower tank and a lower segment proximate the floor of said lower tank;
    a collector flight assembly including a flight attachment defining a part of said chain loop, and a collector flight, attached to said flight attachment and movable therewith, having a front face adapted to scrape sludge from the floor of the lower tank when said collector flight is proximate the floor of said lower tank; and means other than said collector flight, for scraping the ceiling of said lower tank, said scraping means including a buoyant member carried by said collector flight assembly and a resilient scraping member attached to said buoyant member and biased toward the ceiling of said lower tank by said buoyant member.

2. A wastewater treatment facility in accordance with claim 1 and further including means for driving said chain loop.

3. A wastewater treatment facility in accordance with claim 2 wherein said buoyant member is pivotally connected to said collector flight assembly and wherein said scraping member is movable with said buoyant member relative to said flight attachment.

4. A wastewater treatment facility in accordance with claim 1 wherein said scraping member is a brush.

5. A wastewater treatment facility in accordance with claim 1 wherein said scraping member is a squeegee.

6. A wastewater treatment facility in accordance with claim 1 wherein said buoyant member comprises a hollow fiberglass tube.

7. A wastewater treatment facility in accordance with claim 6 wherein, in cross section, said tube has the general shape of a square with four corners and four sides, and wherein said tube is pivotally connected to said flight attachment proximate one of said corners.

8. A wastewater treatment facility in accordance with claim 7 wherein said scraping member is attached to and extends parallel with the highest of the sides of the square which extend from the corner pivotally connected to said flight attachment, considered when said flight attachment defines a portion of said upper segment of said chain loop.

9. A wastewater treatment facility in accordance with claim 8 wherein said buoyant member further comprises foam inside said tube.

10. A wastewater treatment facility in accordance with claim 9 wherein said foam comprises closed cell polyurethane foam.

11. A wastewater treatment facility comprising:
a stacked tank clarifier including a lower tank having a floor, and including an upper tank positioned above said lower tank, said upper tank having a bottom defining a ceiling of said lower tank;
a chain loop in said lower tank, said chain loop defining a rotatable endless loop including an upper segment proximate the ceiling of said lower tank and a lower segment proximate the floor of said lower tank;
means for driving said chain loop;
a collector flight, attached to said chain loop and rotatable therewith, having a front face adapted to scrape sludge from the floor of the lower tank when said collector flight is proximate the floor of said lower tank, and having a rear face opposite said front face;
means, other than said collector flight, for scraping the ceiling of said lower tank, said scraping means includes a flight attachment forming a part of said chain loop, a buoyant member pivotally connected to said flight attachment at a location proximate said rear face, and a resilient scraping member attached to said buoyant member, said scraping member being biased toward the ceiling of said lower tank by said buoyant member and being movable with said buoyant member relative to said flight attachment, and said collector flight being attached to said flight attachment.

12. A waste water treatment facility in accordance with claim 11 wherein said buoyant member pivots said scraping member away from the floor of said lower tank when said flight attachment defines a portion of said lower segment of said chain loop.

13. A wastewater treatment facility in accordance with claim 11 wherein said scraping member extends generally upwardly and rearwardly from said flight attachment toward said ceiling of said lower tank when said flight attachment defines a portion of said upper segment of said chain loop, wherein a forward direction is defined as the direction of travel of the upper segment of said chain loop, and wherein said wastewater treatment facility further includes means, other than the buoyancy of said buoyant member, for preventing said scraping member from pivoting forward of vertical when said flight attachment defines a portion of said upper segment of said chain loop.

14. An apparatus comprising flexible member defining a rotatable endless loop including a collector flight assembly comprising a flight attachment and a collector flight attached to said flight attachment;
a hollow fiberglass tube, said tube having a corner and a side extending from said corner;
foam inside said tube;
a brush attached to said side and extending in a direction that is generally parallel to the direction in which said side extends from said corner; and
a bracket including a barrel proximate said corner and extending in a direction parallel to the direction in which said corner extends, said barrel being pivotally connected to said flight attachment, said bracket further including a main portion extending from said barrel and along said side of said tube, said tube being attached to said main portion of said bracket.

15. An apparatus in accordance with claim 14 wherein said foam fills said tube and comprises closed cell polyurethane foam.

16. A collector flight assembly for use in a a chain loop in a tank, the chain loop having an upper segment and a lower segment below the upper segment, the tank being adapted to contain liquid, said collector flight assembly comprising:
a flight attachment;
a collector flight attached to said flight attachment and having a sludge collecting surface;
a resilient scraping member pivotally attached to said flight attachment; and
means yieldably biasing said scraping member upwardly.

17. An assembly in accordance with claim 16 wherein said scraping member is attached to said flight attachment so as to extend generally upwardly and rearwardly from said flight attachment, when said flight attachment defines a portion of the upper segment of the chain loop, wherein a forward direction is defined as the direction of travel of the upper segment of the chain loop, and wherein said assembly further includes means of preventing said scraping member from pivoting forward of vertical when said flight attachment defines a portion of said upper segment of said chain loop.

18. An assembly in accordance with claim 16 wherein said collector flight has a rear face opposite said front face, and wherein said buoyant member is pivotally connected to said flight attachment at a location proximate said rear face.

19. An assembly in accordance with claim 18 wherein said biasing means comprises a buoyant member pivotally attached to said flight attachment, and wherein said resilient scraping member is attached to said buoyant member and pivotable with said buoyant member.

20. A wastewater treatment facility comprising:
a stacked tank clarifier including a lower tank, and an upper tank in said lower tank, said upper tank having a bottom defining a ceiling of said lower tank, and said lower tank further having a floor;
a chain loop, said chain loop including an upper segment proximate the ceiling of said lower tank and a lower segment proximate the floor of said lower tank, and said chain loop including a flight attachment;
a motor selectively driving said chain loop;
a collector flight attached to said flight attachment, said collector flight having a front face adapted to scrape sludge from the floor of the lower tank when said flight attachment defines a portion of said lower segment of said chain loop, and said collector flight having a rear face opposite said front face;
a buoyant member pivotally connected to said flight attachment at a location proximate said rear face; and
a resilient scraping member attached to said buoyant member, said scraping member being yieldably biased into scraping engagement with the ceiling of said lower tank, by said buoyant member, when said flight attachment defines a portion of said upper segment of said chain loop, and said scraping member being pivoted away from the floor of said lower tank, by said buoyant member, when said flight attachment defines a portion of said lower segment of said chain loop.

* * * * *